United States Patent
Petrillo et al.

(10) Patent No.: US 10,754,712 B2
(45) Date of Patent: Aug. 25, 2020

(54) TECHNIQUES FOR AUTOMATICALLY ALLOCATING TASKS TO APPLICATION PROGRAMMING INTERFACES

(71) Applicant: DISNEY ENTERPRISES, INC., Burbank, CA (US)

(72) Inventors: Matthew Charles Petrillo, Falls Church, VA (US); Monica Alfaro Vendrell, Castellar del Valles (ES); Marc Junyent Martin, Cornella de Llobregat (ES); Anthony M. Accardo, Los Angeles, CA (US); Miquel Angel Farre Guiu, Bern (CH); Katharine S. Ettinger, Santa Monica, CA (US); Avner Swerdlow, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 52 days.

(21) Appl. No.: 16/048,169

(22) Filed: Jul. 27, 2018

(65) Prior Publication Data

US 2020/0034215 A1    Jan. 30, 2020

(51) Int. Cl.
*G06F 9/54*     (2006.01)
*G06F 9/48*     (2006.01)
*G06N 3/08*     (2006.01)

(52) U.S. Cl.
CPC ............ *G06F 9/542* (2013.01); *G06F 9/4881* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,760,384 B1 * | 1/2017 | Chauhan | |
| 9,626,627 B1 * | 4/2017 | Deluca | |
| 2016/0292018 A1 * | 6/2016 | Laredo | |
| 2019/0188760 A1 * | 6/2019 | Ekambaram | |

* cited by examiner

*Primary Examiner* — Syed A Roni
(74) *Attorney, Agent, or Firm* — Artegis Law Group, LLP

(57) ABSTRACT

In various embodiments, a broker application automatically allocates tasks to application programming interfaces (APIs) in microservice architectures. After receiving a task from a client application, the broker application performs operation(s) on content associated with the task to compute predicted performance data for multiple APIs. The broker application then determines that a first API included in the APIs should process the first task based on the predicted performance data. The broker application transmits an API request associated with the first task to the first API for processing. After receiving a result associated with the first task from the first API, the client application performs operation(s) based on the result.

20 Claims, 4 Drawing Sheets

TECHNIQUES FOR AUTOMATICALLY ALLOCATING TASKS TO APPLICATION PROGRAMMING INTERFACES

BACKGROUND

Field of the Various Embodiments

Embodiments of the present invention relate generally to monitoring and controlling the use of microservices, and more specifically to techniques for automatically allocating tasks to application programming interfaces.

Description of the Related Art

Many applications are developed based on a microservice architecture that facilitates integration with any number of different microservices. A typical microservice is an independently deployed application that implements a fine-grained service and interacts with other applications, including other microservices, via one or more well-defined interfaces. In general, a client application sends a request to a microservice via an application programming interface (API) associated with the microservice, the microservice processes the request, and the API provides a result back to the client application. A request to a microservice typically describes a task that can involve any amount and any type of content. An example of a well-known microservice request is a request to translate audio to text.

One drawback of using APIs to perform tasks in microservice architectures is that tasks oftentimes are assigned to APIs that are unable to properly perform those tasks and, consequently, time and resources are needlessly wasted. For example, to reliably identify the maker of a car, a car maker identification API may require an image of the outside of the car that is taken at a certain angle. If a client application sends an identification request that includes an image of an interior of a car to the API, then the client application receives an inconclusive result from the API. In this example, time and resources are wasted transmitting the request to the API, analyzing the image, receiving the result from the API, and determining that the result is inconclusive.

One way to increase the likelihood that tasks are assigned to appropriate APIs in microservice architectures is to evaluate the capabilities of the APIs prior to assigning the tasks. However, existing techniques for evaluating the capabilities of APIs are problematic. For instance, one approach to evaluating the capabilities of APIs involves a manual trial-and-error based process that can be prohibitively time consuming. In addition, because a typical API and the associated microservice often evolve over time, an evaluation of an API that was performed in the past may not accurately reflect the current capabilities of that API. Because of the difficulties associated with determining the current capabilities of APIs, a typical client application assigns requests to APIs indiscriminately, despite the inefficiencies that can be associated with doing so.

As the foregoing illustrates, what is needed in the art are more effective techniques for using application programming interfaces to process tasks in microservice architectures.

SUMMARY

One embodiment of the present invention sets forth a computer-implemented method for automatically allocating tasks to application programming interfaces (APIs). The method includes receiving a first task from a first client application, where the first task is associated with first content; performing one or more operations on the first content to generate first predicted performance data associated with a plurality of application programming interfaces (APIs); determining that a first API included in the plurality of APIs should process the first task based on the first predicted performance data; transmitting a first API request associated with the first task to the first API for processing; and receiving a first result associated with the first task from the first API, wherein the first client application performs at least one operation based on the first result.

At least one technical advantage of the disclosed techniques relative to the prior art is that the disclosed techniques automatically optimize the use of application programming interfaces (APIs) to process tasks. In that regard, unlike prior art approaches that indiscriminately allocate tasks to APIs, the disclosed techniques characterize the content associated with tasks to more optimally allocate tasks across various APIs. Consequently, the disclosed techniques reduce the inefficiencies attributable to allocating tasks to APIs that are not capable of performing those tasks. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
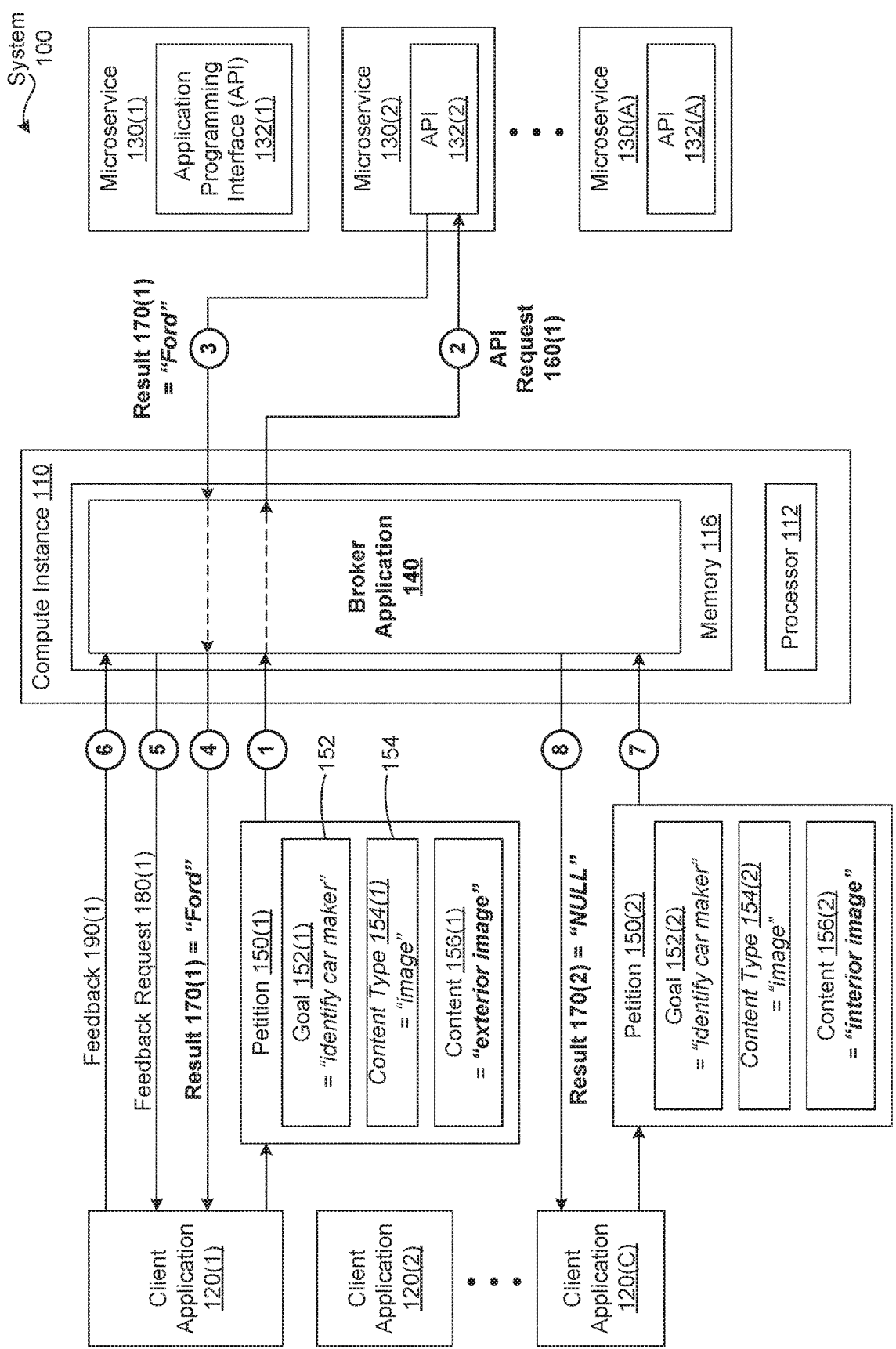
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a compute instance 110, any number of client applications 120, and any number of microservices 130. In alternate embodiments, the system 100 may include any number of compute instances 110. For explanatory purposes, multiple instances of like objects are denoted with reference numbers identifying the object and parenthetical numbers identifying the instance where needed. In various embodiments, any number of the components of the system 100 may be distributed across multiple geographic locations or included in one or more cloud computing environments (i.e., encapsulated shared resources, software, data, etc.) in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instance 110 is configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

Each of the client applications 120 is a software application developed based on a microservice architecture that facilitates integration with the microservices 130. In a complementary fashion, each of the microservices 130 is an application that performs one or more tasks for other software applications, including other microservices 130. Typically, each of the microservices 130 is independently deployed and implements a fine-grained service. As shown, each of the microservices 130 includes, without limitation, an application programming interface (API) 132. In alternate embodiments, each of the microservices 130 may include any number of APIs 132.

Example of functionality provided by the microservices 130 include, without limitation, image recognition, speech to text translation, and text translation, to name a few. The microservices 130, the client applications 120, and any number of other software applications interact via the APIs 132. In alternate embodiments, each of the microservices 130 may implement any number of well-defined interfaces instead of or in addition to the API 132, and the microservices 130, the client applications 120, and any number of other software applications may interact via the well-defined interfaces.

In a conventional system, conventional client applications send API requests 160 to the microservices 130 via the APIs 132. Each API request 160 specifies a task that is to be performed on associated content. In response, the microservices 130 process the API requests 160, and the APIs 132 return results 170 to the conventional client applications. One drawback of using APIs to perform tasks in conventional systems is that tasks oftentimes are assigned to APIs that are unable to properly perform those tasks and, consequently, time and resources are needlessly wasted. Because evaluating the current capabilities of APIs is often prohibitively time consuming, a typical conventional client application assigns requests to APIs indiscriminately, despite the inefficiencies that can be associated with doing so.

Automatically Allocating Tasks to APIs Based on Content

To reduce the amount of time and resources associated with API requests 160 that do not culminate in meaningful results 170, the system 100 includes, without limitation, a broker application 140. The broker application 140 resides in the memory 116 and executes on the processor 112 of the compute instance 110. In general, the broker application 140 acts as an intermediary between the client applications 120 and the APIs 132, performing any number and type of filtering and/or allocation operations associated with any number of requested tasks.

In operation, the client application 120 generates a petition 150 that describes a requested task. As shown, the petition 150 includes, without limitation, a goal 152, a content type 154, and content 156. The goal 152 specifies the purpose of the requested task in any technically feasible format and in any technically feasible fashion. For instance, the goal 152 could be "identify car make," "translate speech to text," etc. The content type 154 specifies a type of content associated with the requested task, such as text, image, or audio. The content 156 is any amount and type of data that is to be processed as part of the requested task. Examples of the content 156 include, without limitation, one or more images, voice recordings, documents, and so forth. The client application 120 then transmits the petition 150 to the broker application 140. In alternate embodiments, the petition 150 may include any amount and type of information that describes a requested task in any technically feasible fashion.

Upon receiving the petition 150, the broker application 140 selects a source model from multiple performance models (not shown in FIG. 1) based on the combination of the goal 152 and the content type 154. As described in greater detail in conjunction with FIG. 2, a trained performance model maps the content 156 to predicted performance data (not shown in FIG. 1) for any number of the APIs 132. The broker application 140 determines whether the source model is trained. The broker application 140 may determine whether the source model is trained in any technically feasible fashion. If the broker application 140 determines that the source model is not trained, then the broker application 140 selects a target API from the APIs 132 in any technically feasible fashion based on any amount of default selection criteria.

If, however, the broker application 140 determines that the source model is trained, then the broker application 140 computes predicted performance data based on the source model and the content 156. The predicted performance data may include any amount and type of information that reflects the predicted performance of any number of the APIs 132 when performing the requested task. For instance, the predicted performance data may include, without limitation, predicted metric values for any number of quality and/or performance metrics, such as accuracy and required compute time. Subsequently, the broker application 140 selects a target API based on the predicted performance data. Notably, the broker application 140 may set the target API equal to one of the APIs 132 or to a value (e.g., NULL) that indicates that the broker application 140 has determined that there is no target API.

The broker application 140 may select the target API in any technically feasible fashion. For instance, in some embodiments, the predicted performance data includes a different performance score for each of the APIs 132. If none of the performance scores satisfy a performance requirement (e.g., a minimum required score), then the broker application 140 sets the target API equal to NULL. Otherwise, the broker application 140 sets the target API equal to the API 132 that is associated with the highest performance score. In other embodiments, the broker application 140 computes return-on-investment (ROI) values based on performance scores included in the predicted performance data and costs associated with the different APIs 132. The broker application 140 then sets the target API equal to the API 132 that is associated with the highest ROI value.

If the target API is equal to NULL, then the broker application 140 generates the result 170 indicating that none of the APIs 132 are able to properly perform the requested task. The broker application 140 then transmits the result 170 to the client application 120 that generated the petition 150. Advantageously, the broker application 140 generates the result 170 without interacting with any of the microservices 130. In this fashion, the broker application 140 reduces time and resource inefficiencies associated with responding to requests that are not able to be properly processed via any of the APIs 132. Further, in some embodiments, the broker application 140 reduces overhead associated with the microservices 130 compared to prior art approaches. For instance, in some embodiments, reducing the number of unproductive requests transmitted to the APIs 132 reduces the time and resources required to spin up any number of the microservices 130.

If, however, the target API is equal to one of the APIs 132, then the broker application 140 generates an API request 160 based on the petition 150 and the target API. The broker application 140 then transmits the API request 160 to the target API. Subsequently, the broker application 140 receives the result 170 from the target API. The broker application 140 then transmits the result 170 to the client application 120 that generated the petition 150. In conjunction with transmitting the result 170 to the client application 120, the broker application 140 transmits a feedback request 180 to the client application 120. The feedback request 180 may request feedback regarding the result 170 and the associated performance of the associated API 132 in any technically feasible fashion.

In response to the feedback request 180, the broker application 140 receives feedback 190 from the client application 120. The broker application 140 generates a performance data point (not shown in FIG. 1) based on the feedback 190, the target API, the goal 152, and the content 156. The broker application 140 then adds the performance data point to a training dataset associated with the source model. In alternate embodiments, the broker application 140 may acquire any amount and type of performance data for training purposes in any technically feasible fashion. For instance, in some embodiments, the broker application 140 may automatically compute metric values for any number of performance metrics based on the result 170 received from the APIs 132. The broker application 140 may then add the metric values to the training dataset associated with the source model.

For each performance model, the broker application 140 performs training operations on the performance model based on the associated training dataset. The broker application 140 may perform the training operations based on any number and type of stimuli. In some embodiments, if the number of performance data points included in a training dataset exceeds a training threshold (not shown in FIG. 1), then the broker application 140 performs training operations on the associated performance model using the training dataset. Subsequently, the broker application 140 re-initializes the training dataset to an empty set. By continuously re-training the performance models, the broker application 140 continuously increases the quality of the predicted performance data. In particular, because the feedback 190 reflects any changes in the performance of the APIs 132 over time, the predicted performance data reliably reflects the current capabilities of the APIs 132.

In other embodiments, the broker application 140 may re-train the performance models at a periodic interval of time (e.g., daily). In various embodiments, the broker application 140 may continue to add performance data points to the training datasets without performing any re-initialization operations. In the same or other embodiments, the broker application 140 may perform training operations using any portion of the performance datasets, such as the performance data points added since the last training operation.

For explanatory purposes only, FIG. 1 depicts a sequence of events involved in generating the results 170(1) and 170(2) in response to, respectively, the petitions 150(1) and 150(2) as a series of numbered bubbles. First, as depicted with the bubble numbered 1, the client application 120(1) transmits the petition 150(1) to the broker application 140. The petition 150(1) includes, without limitation, the goal 152(1) of "identify car maker," the content type 154(1) of "image," and the content 156(1) of an exterior image. For explanatory purposes only, the API 132(2) is typically able to identify a car maker based on exterior image(s) of a car but is unable to identify a car maker based on interior image(s) of the car, and none of the other APIs 132 are able to identify car makers.

Accordingly, upon receiving the petition 150(1), the broker application 140 selects the API 132(2) based on a performance model and the content 156(1). More precisely, the broker application 140 determines that a performance metric value indicating the likelihood that the microservice 130(2) is able to correctly identify the car maker based on the provided exterior image satisfies a performance requirement. Consequently, as depicted with bubble numbered 2, the broker application 140 generates and transmits the API request 160(1) to the API 132(2).

Subsequently, the API 132(2) processes the exterior image, generates the result 170(1) of "Ford," and transmits the result 170(1) to the broker application 140 (depicted with the bubble numbered 3). As depicted with the bubble numbered 4, the broker application 140 transmits the result 170(1) to the client application 120(1). In addition to transmitting the result 170(1) to the client application 120(1) and as depicted with the bubble numbered 5, the broker application 140 also transmits the feedback request 180(1) to the client application 120(1). In response and as depicted with the bubble numbered 6, the client application 120(1) transmits the feedback 190(1) to the broker application 140.

By contrast, as depicted with the bubble numbered 7, the client application 120(C) transmits the petition 150(2) to the broker application 140. The petition 150(2) includes, without limitation, the goal 152(2) of "car maker identification," the content type 154(2) of "image," and the content 156(2) of an interior image. Upon receiving the petition 150(1), the broker application 140 selects none of the APIs 132 based on a performance model and the content 156(2). More precisely, the broker application 140 determines that none of the performance metric values associated with the content 156(2) satisfy the performance requirement. Consequently, as depicted with the bubble numbered 8, the broker application 140 transmits the result 190(2) of NULL to the client application 120(C). Advantageously, the microservice 130(2) does not waste time or resources fruitlessly attempting to determine the car maker based on the interior image.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to automatically allocating requested tasks to the APIs 132 based on performing any number and type characterization operations on content associated with the requested tasks in any technically feasible fashion. For instance, in some embodiments, the broker application 140 allocates each requested task to one of the APIs 132 without performing any filtering operations. In the same or other embodiments, the broker application 140 allocates requested tasks to APIs 132 based on a list that maps one or more characteristics of the requested tasks to the APIs 132.

It will be appreciated that the system 100 shown herein is illustrative and that variations and modifications are possible. For example, the functionality provided by the broker application 140 as described herein may be integrated into or distributed across any number of software applications and any number of components of the system 100. Further, the connection topology between the various units in FIG. 1 may be modified as desired.

Predicting the Performance of APIs

Figure 2:
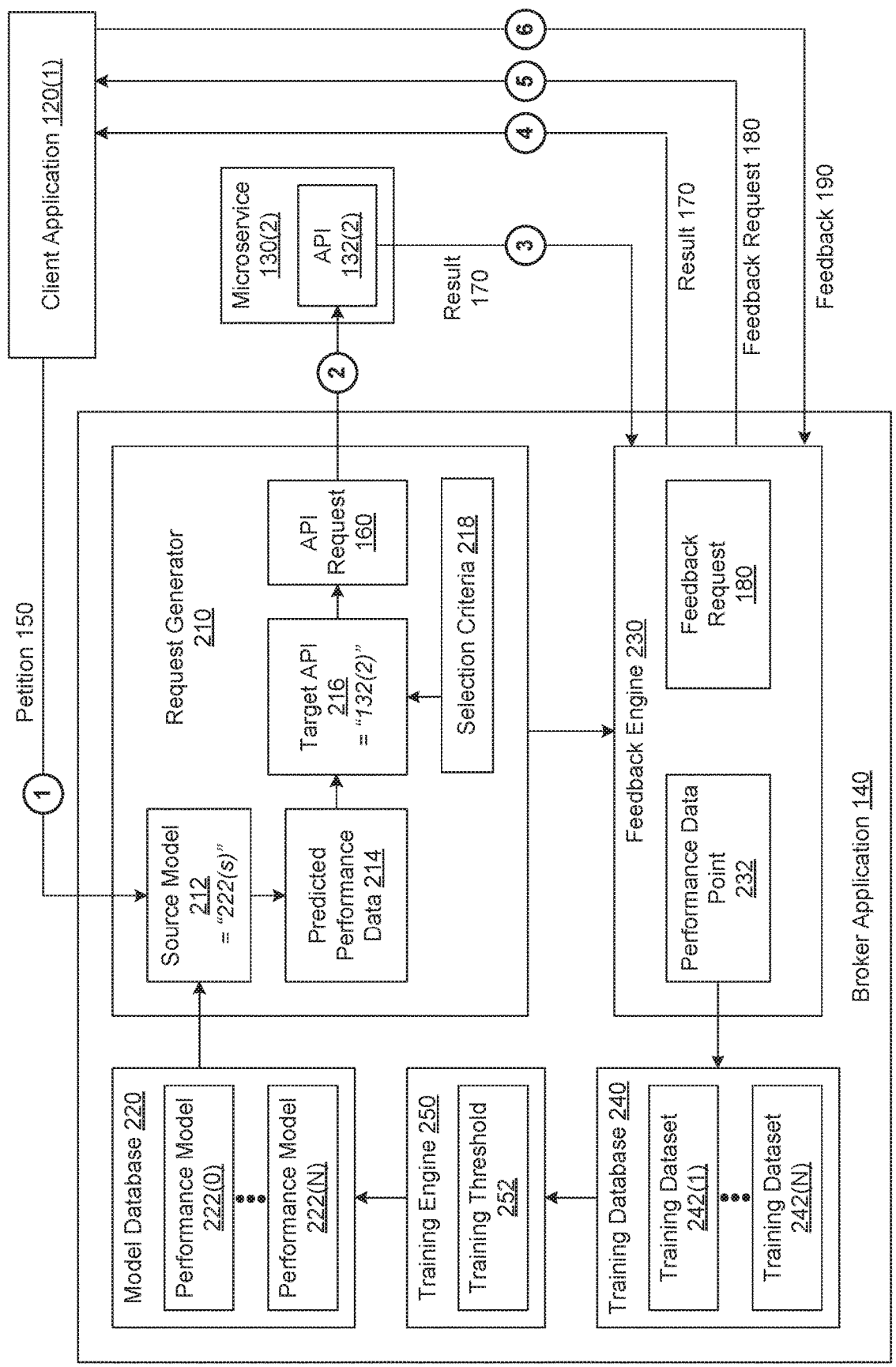
FIG. 2 is a more detailed illustration of the broker application of FIG. 1, according to various embodiments of the present invention.

FIG. 2 is a more detailed illustration of the broker application 140 of FIG. 1, according to various embodiments of the present invention. For explanatory purposes only, the sequence of events involved in generating the results 170(1) and 170(2) that is depicted in FIG. 1 as a series of numbered bubbles is also depicted in FIG. 2 as a series of numbered bubbles. Accordingly, the bubble numbered 1 in FIG. 1 corresponds to the bubble numbered 1 in FIG. 2, the bubble numbered 2 in FIG. 1 corresponds to the bubble numbered 2 in FIG. 2, and so forth.

As shown, the broker application 140 includes, without limitation, a model database 220, a training database 240, a request generator 210, a feedback engine 230, and a training engine 250. The model database 220 includes any number of performance models 222 (such as 222(0) through 222(N)). Each of the performance models 222 is associated with a different combination of the goal 152 and the content type 154. For instance, the performance model 222(0) could be associated with the goal 152 of "identify car make" and the content type 154 of "image." By contrast, the performance model 222(1) could be associated with the goal 152 of "translate speech to text" and the content type 154 of "audio." Each of the performance models 222 may be any type of machine-learning model that can extract features from the content 154 and then classify the content 154 based on the extracted features. Further, the type of machine-learning model may vary between performance models 222. For instance, in some embodiments, the performance model 222(1) is a neural network and the performance model 222(2) is a Support Vector Machine (SVM).

Initially, the broker application 140 acquires untrained performance models 222 and/or pre-trained performance models 222 to generate the model database 220. For instance, in some embodiments, the broker application 140 implements transfer learning techniques to reduce the time required to train any number of the performance models 222. For each of the performance models 222 associated with the content type 154 of "image," the broker application 140 acquires a different instance of a convolutional neural network (CNN) pre-trained using an existing image database (e.g., imageNet). Examples of CNNs includes, without limitation, Visual Geometry Group 16 (VGG-16), Inception, Residual Network (ResNet), and the like. For each of the performance models 222 associated with the content type 154 of "text," the broker application 140 acquires a different instance of a recurrent neural network (e.g., long short-term memory) pre-trained using Word2Vec word embeddings. For each of the performance models 222 associated with the content type 154 of "audio," the broker application 140 acquires a different instance of a recurrent neural network, reusing architectures such as Deep Speech or building small nets without pre-training.

As shown, the training database 240 includes, without limitation, N training datasets 242, where N is the number of the performance models 222. In general, the training dataset 242(x) is associated with the performance model 222(x). Each training dataset 242 includes any number of performance data points 232. Each performance data point 232 is associated with one of the petitions 150 and indicates, without limitation, the goal 152, the content 156, a target API 216, and the performance of the target API 216. The performance data point 232 may indicate the performance of the target API 216 in any technically feasible fashion.

In some embodiments, the performance data point 232 specifies metric values for one or more quality metrics and/or performance metrics. For example, each of the performance data points 232 could include a satisfaction score, an accuracy score, and a turn-around time to indicate the performance of the associated target API 216. The satisfaction score, the accuracy score, and the turn-around time may be subjectively assigned by a user and included in the feedback 190 or automatically computed.

The request generator 210 includes, without limitation, a source model 212, predicted performance data 214, the target API 216, selection criteria 218, and an API request 160. Upon receiving the petition 150, the request generator 210 determines the source model 212 based on the associated goal 152 and the associated content type 154. More specifically, the request generator 210 sets the source model 212 equal to the performance model 222 that is associated with both the goal 152 and the content type 154.

The request generator 210 then determines whether the source model 212 is trained. The request generator 210 may determine whether the source model 212 is trained in any technically feasible fashion. If the request generator 210 determines that the source model 212 is not trained, then the request generator 210 selects the target API 216 from the APIs 132 in any technically feasible fashion based on any amount of default selection criteria. For example, the request generator 210 could determine the target API 216 based on a default list that associates different combinations of the goal 152 and the content type 154 with different APIs 132.

The request generator 210 may acquire the default list in any technically feasible fashion. In some embodiments, the request generator 210 may acquire the default list via a graphical user interface (GUI).

If, however, the request generator 210 determines that the source model 212 is trained, then the request generator 210 generates the predicted performance data 214 based on the source model 212 and the content 156 associated with the petition 150. The predicted performance data 214 may include any amount and type of information that is consistent with the training dataset(s) 242 used to train the source model 212. In various embodiments, for each of the APIs 132, the predicted performance data 214 includes, without limitation, a different set of metric values for a set of metrics. The set of metrics may include any number and type of performance metrics and quality metrics in any technically feasible fashion. For example, the set of metrics could include a single, overall satisfaction metric.

The request generator 210 determines the target API 216 based on the predicted performance data 214 and the selection criteria 218. The selection criteria 218 may specify any amount and type of criteria in any technically feasible fashion. For instance, in some embodiments, the selection criteria 218 includes, without limitation, one or more performance requirements and a ranking equation. The request generator 210 performs one or more comparison operations between the predicted performance data 214 and the performance requirements to select the APIs 132 that satisfy the performance requirements. If the request generator 210 does not select any of the APIs 132, then the request generator 210 sets the target API 216 equal to NULL. If the request generator 210 sets the target API 216 equal to NULL, then the request generator 210 provides error information to the client application 120 that generated the petition 150. The request generator 210 may provide the error information in any technically feasible fashion. For instance, in some embodiments, the request generator 210 transmits the result 170 of NULL to the client application 120. In the same or other embodiments, the request generator 210 may indicate to the client application 120 that the task associated with the petition 150 has not been allocated to any of the APIs 132. Notably, after providing error information to the client application 120, the request generator 210 ceases to process the associated petition 150.

If the request generator 210 selects a single API 132, then the request generator 210 sets the target API 216 equal to the selected API 132. If the request generator 210 selects more than one of the APIs 132, then the request generator 210 ranks the selected APIs 132 based on the ranking equation and the predicted performance data 214. Finally, the request generator 210 sets the target API 216 equal to the selected API 132 having the highest rank. An example of a ranking equation is an equation that weights a satisfaction score associated with a given API 132 with a cost associated with using the API 132.

If the request generator 210 sets the target API 216 equal to one of the microservices 132, then the request generator 210 generates a new API request 160 based on the petition 150 and the target API 216. Subsequently, the request generator 210 transmits the API request 160 to the target API 216, thereby causing the target API 216 to perform the task associated with the petition 150. In alternate embodiments, the request generator 210 may cause the target API 216 to perform the task associated with the petition 150 in any technically feasible fashion. For instance, in some embodiments, instead of transmitting the API request 160 directly to the target API 216, the request generator 210 transmits the API request 160 indirectly to the target API 216 via a proxy server.

After the target API 216 finishes processing the API request 160, the feedback engine 230 receives the result 170 from the target API 216. As shown, the feedback engine 230 includes, without limitation, the feedback request 180 and the performance data point 232. The feedback request 180 solicits feedback from the client regarding the performance of the target API 216 and/or the quality of the result 170. For instance, the feedback request 180 may request that a user provide a satisfaction score. The feedback engine 230 transmits both the result 170 and the feedback request 180 to the client 120 that generated the petition 150. In alternate embodiments, the request generator 210 and/or the feedback engine 230 may cause the client application 120 to receive the result 170 and/or the feedback request 180 in any technically feasible fashion. For instance, in some embodiments, the request generator 210 configures the target API 216 to transmit the result 170 directly to the client application 120.

Upon receiving the feedback 190 from the client application 120, the feedback engine 230 generates the performance data point 232 based on the feedback 190. The performance data point 232 may include any amount and type of information that is relevant to allocating tasks to the target API 216. In some embodiments, the feedback engine 230 may automatically compute any amount and type of information included in the performance data point 232. After generating the performance data point 232, the feedback engine 230 adds the performance data point 232 to the training dataset 242 associated with the source model 212.

As shown, the training engine 250 includes, without limitation, a training threshold 252 that specifies a number. If the number of the performance data points 232 included in the training dataset $242(x)$ exceeds the training threshold 252, then the training engine 250 performs training operations on the performance model $222(x)$. More specifically, the training engine 250 trains the performance model $222(x)$ using the training dataset $242(x)$. After the training engine 240 finishes training the performance model $222(x)$, the training engine 240 sets the training dataset $242(x)$ equal to the empty set. In alternate embodiments, the training threshold 252 may be replaced by an initial training threshold and a re-training threshold, where the initial training threshold is higher than the re-training threshold. In the same or other embodiments, the training engine 250 may include different training threshold(s) for each of the performance models 222. In general, the training engine 250 may determine when to train the source models 222 in any technically feasible fashion. For example, the training engine 250 could be configured to train the source models 222 daily and/or in response to a training request received from a GUI.

Advantageously, the broker application 140 not only reduces time and resources typically wasted generating uninformative results 170, the broker application 140 also optimizes the API 132 used to generate the results 170 based on the selection criteria 216. For instance, suppose that the API 132(6) and the API 132(17) are both associated with the goal 152 "speech recognition" and the content type 154 "audio." Further, suppose that the API 132(6) is usually capable of processing the content 156 that includes background noise, while the API 132(17) is typically incapable of processing the content 156 that includes background noise. Finally, suppose that the time required for the API 132(6) to process the content 156 is substantially greater than the time required for the API 132(17) to process the same content 156. Based on an overall performance score that weights a quality metric value by the required processing time, the request generator 210 would assign content 156 that includes background noise to the API 132(6) and content 156 that does not include background noise to the API 132(17).

Note that the techniques described herein are illustrative rather than restrictive, and may be altered without departing from the broader spirit and scope of the invention. For instance, in some alternate embodiments, the request generator 210 implements "greedy" functionality based on a probability distribution. Upon receiving the petition 150, the request generator 210 periodically and pseudo-randomly determines the target API 216 based on the probability distribution instead of the performance models 222 and the selection criteria 216. For example, for 20% of the petitions 150, the request generator 210 could determine the target API 216 pseudo-randomly as per the probability distribution. For the remaining 80% of the petitions 150, the request generator 210 could determine the target API 216 based on the source model 212 associated with the petition 150 and the selection criteria 216.

Advantageously, implementing greedy functionality increases the ability of the request generator 210 to adapt to new APIs 132, changes to existing APIs 132, and new content 156. For example, suppose that 95% of the requests 150 having the goal 152 of "image recognition" have typically included the content 156 of a cartoon character image. Further, suppose that the API 132(4) is an image recognition API that specializes in identifying humans and is typically unable to identify cartoon characters. Because the API 132(4) is unable to properly process the cartoon character images, the request generator 210 rarely sets the target API 216 equal to the API 132(4) based on the selection criteria 216. During the World Cup, 80% of the requests 150 having the goal 152 of "image recognition" include the content 156 of a soccer player image. Because the request generator 210 periodically sets the target API 216 equal to the API 132(4) based on the probability distribution, the source model 212 is re-trained to reflect that the API 132(4) properly processes soccer player images. As a result, the request generator 210 is more likely to set the target API 216 equal to the API 132(4) based on the selection criteria 216.

Figure 3A:
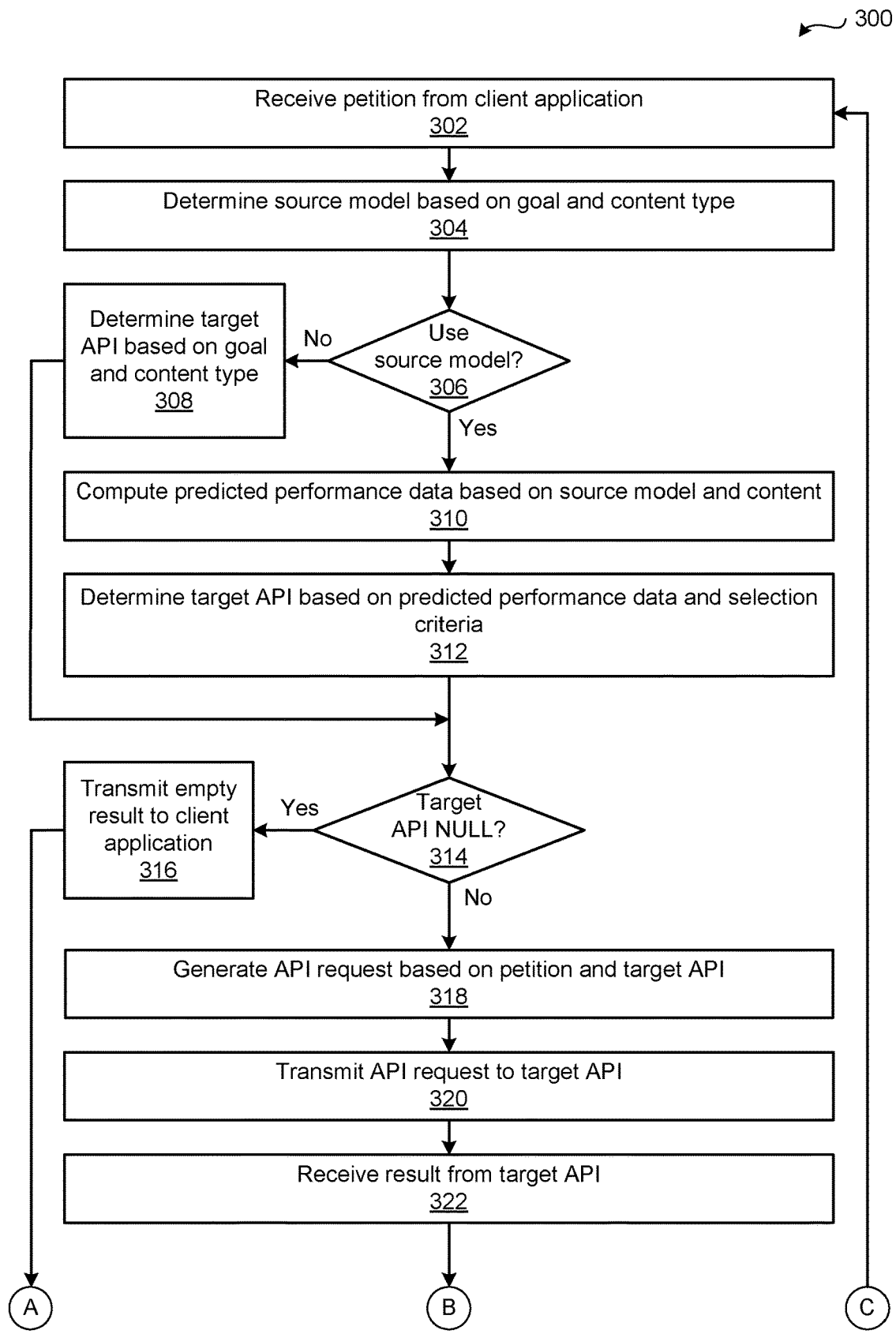
FIGS. 3A-3B set forth a flow diagram of method steps for automatically allocating tasks to application programming interfaces, according to various embodiments of the present invention.
Figure 3B:
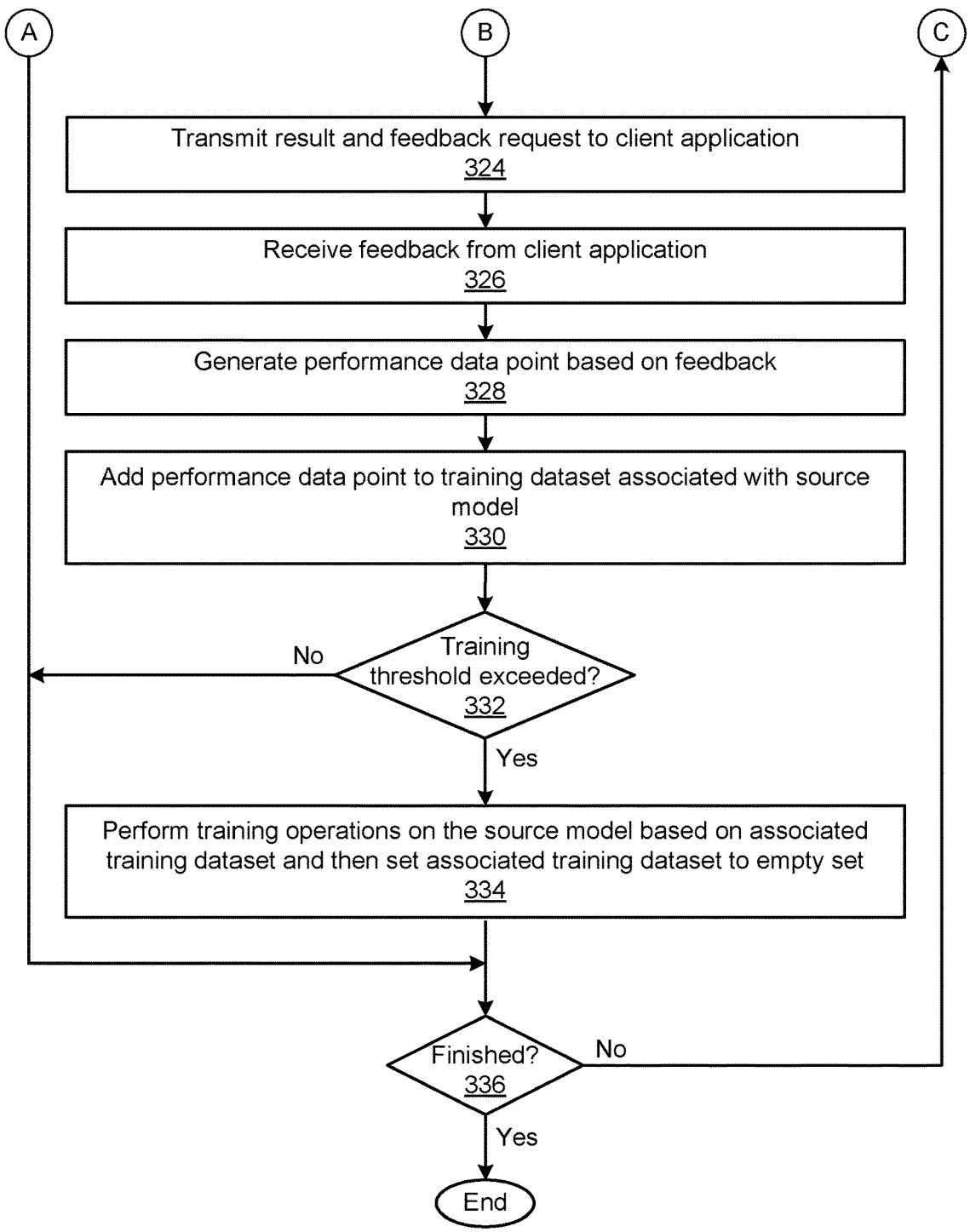

FIGS. 3A-3B set forth a flow diagram of method steps for automatically allocating tasks to application programming interfaces, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 302, where the broker application 140 receives a new petition 150 from one of the client applications 120. As described previously herein, the petition 150 describes a requested task. At step 304, the request generator 210 sets the source model 212 equal to the performance model 222 associated with both the goal 152 included in the petition 150 and the content type 154 included in the petition 150. At step 306, the request generator 210 determines whether the source model 212 is trained. If, at step 306, the request generator 210 determines that the source model 212 is not trained, then the method 300 proceeds to step 308. At step 308, the request generator 210 selects the target API 216 based on the goal 152 and the content type 154, and the method 300 proceeds directly to step 314.

If, however, at step 306, the request generator 210 determines that the source model 212 is trained, then the method 300 proceeds directly to step 310. At step 310, the request generator 210 computes the predicted performance data 214 based on the source model 212 and the content 156 associated with the petition 150. At step 312, the request generator 210 determines the target API 216 based on the predicted performance data 214 and the selection criteria 218.

At step 314, the request generator 210 determines whether the target API 216 is equal to NULL. If, at step 314, the request generator 210 determines that the target API 216 is not equal to NULL, then the method 300 proceeds directly to step 318. At step 318, the request generator 210 generates the API request 160 based on the petition 150 and the target API 216. At step 320, the request generator 210 transmits the API request 160 to the target API 216. At step 322, the feedback engine 230 receives the result 170 from the target API 216. At step 324, the feedback engine 230 transmits the result 170 and the feedback request 180 to the client application 120 from which the feedback engine 230 received the petition 150.

At step 326, the feedback engine 230 receives the feedback 190 from the client application 120. At step 328, the feedback engine 230 generates the performance data point 232 based on the feedback 190, the target API 216, the goal 152, and the content 156. At step 330, the feedback engine 230 adds the performance data point 232 to the training dataset 242 associated with the source model 212. At step 332, the training engine 250 determines whether the number of the performance data points 232 included in the training dataset 242 associated with the source model 212 exceeds the training threshold 252.

If, at step 332, the training engine 250 determines that the number of the performance data points 232 included in the training dataset 242 associated with the source model 212 exceeds the training threshold 252, then the method 300 proceeds to step 334. At step 334, the training engine 250 performs one or more training operations on the source model based on the associated training dataset 242 and then sets the associated training dataset 242 equal to the empty set.

If, however, at step 332, the training engine 250 determines that the number of the performance data points 232 included in the training dataset 242 associated with the source model 212 does not exceed the training threshold 252, then the method 300 proceeds directly to step 336.

Returning now to step 314, if the request generator 210 determines that the target API 216 is equal to NULL, then the method 300 proceeds to step 316. At step 316, the target API 216 generates and transmits the result 170 of NULL to the client application 120 from which the feedback engine 230 received the petition 150. The method 300 then proceeds directly to step 336.

At step 336, the broker application 140 determines whether the broker application 140 has finished processing the petitions 150. The broker application 140 may determine whether the broker application 140 has finished processing the petitions 150 in any technically feasible fashion. For instance, in some embodiments, the broker application 140 determines whether a user has requested that the broker application 140 terminate. If, at step 336, the broker application 140 determines that the broker application 140 has not finished processing the petitions 150, then the method 300 returns to step 302 where the broker application 140 receives a new petition 150 from one of the client applications 120. If, however, at step 336, the broker application 140 determines that the broker application 130 has finished processing the petitions 150, then the method 300 terminates.

In sum, the disclosed techniques enable client applications to effectively use application programming interfaces (APIs) to perform tasks. In operation, a broker application receives a petition from a client application. The petition includes, without limitation, a goal, a content type, and content. The broker application selects a source model from multiple performance models based on the combination of the goal and the content type. If the broker application determines that the source model is not trained, then the broker application determines a target API based on the goal and the content type. By contrast, if the broker application determines that the source model is trained, then the broker application computes a target API based on the source model and the content. In general, the source model is a performance model that maps content to predicted performance data for any number of APIs.

If the target API is equal to NULL, then the broker application generates a result of NULL and returns the result to the client application. Otherwise, the broker application generates an API request based on the target API and the petition. The broker application transmits the API request to the target API, receives the result from the target API, and relays the result to the client application. As part of relaying the result to the client application, the broker application requests feedback from the client application regarding the quality of the result. The broker application generates a performance data point based on the feedback received from the client application, the target API, the goal, and the content. Subsequently, the broker application adds the performance data point to a training dataset associated with the source model. If the number of performance data points included in the training dataset exceeds a training threshold, then the broker application performs training operations on the source model based on the training dataset.

At least one technical advantage of the disclosed techniques relative to prior art solutions is that the disclosed techniques automatically allocate tasks across application programming interfaces (APIs) based on characteristics of the tasks. Unlike prior art approaches that indiscriminately allocate tasks to API, the disclosed techniques perform one or more optimization operations to allocate tasks to target APIs. In particular, the disclosed techniques may filter a task associated with content that is similar to content that none of the APIs are capable of successfully processing. Consequently, the time and resource inefficiencies associated with unsuccessful tasks are reduced relative to prior art techniques. Further, by continually training the performance models, the disclosed techniques ensure that the performance models accurately reflect the current capabilities of the APIs These technical advantages provide one or more technological advancements over the prior art.

1. In some embodiments, a computer-implemented method comprises receiving a first task from a first client application, wherein the first task is associated with first content; performing one or more operations on the first content to generate first predicted performance data associated with a plurality of application programming interfaces (APIs); determining that a first API included in the plurality of APIs should process the first task based on the first predicted performance data; transmitting a first API request associated with the first task to the first API for processing; and receiving a first result associated with the first task from the first API, wherein the first client application performs at least one operation based on the first result.

2. The computer-implemented method of clause 1, wherein performing the one or more operations comprises determining that a first machine-learning model included in a plurality of machine-learning models should be used to generate the first predicted performance data based on one or more characteristics of the first task, wherein the first machine-learning model maps task content to predicted performance data; and generating the first predicted performance data based on the first content and the first machine-learning model.

3. The computer-implemented method of clauses 1 or 2, wherein the first machine-learning model comprises a convolutional neural network, a recurrent neural network, or a Support Vector Machine.

4. The computer-implemented method of any of clauses 1-3, further comprising receiving a second task from the first client application, wherein the second task is associated with second content; performing one or more operations on the second content to generate second predicted performance data associated with the plurality of APIs; determining, based on the second predicted performance data, that none of the APIs included in the plurality of APIs satisfies a performance requirement; and indicating to the first client application that the second task has not been allocated to any of the APIs included in the plurality of APIs.

5. The computer-implemented method of any of clauses 1-4, further comprising receiving, from the first client application, feedback associated with the first result; performing one or more training operations on a first machine-learning model based on the first content and the feedback to generate a second machine-learning model that maps task content to predicted performance data; receiving a second task from a second client application, wherein the second task is associated with second content; determining that a second API included in the plurality of APIs should process the second task based on the second machine-learning model and the second content; transmitting a second API request associated with the second task to the second API for processing; and receiving a second result associated with the second task from the second API, wherein the second client application performs at least one operation based on the second result.

6. The computer-implemented method of any of clauses 1-5, wherein the first predicted performance data includes a different value for a performance metric for each API included in the plurality of APIs.

7. The computer-implemented method of any of clauses 1-6, wherein the first content comprises at least one of text, audio content, and image content.

8. The computer-implemented method of any of clauses 1-7, further comprising receiving a second task from a second client application; determining that a second API included in the plurality of APIs should process the second task based a probability distribution; transmitting a second API request associated with the second task to the second API for processing; and receiving a second result associated with the second task from the second API, wherein the second client application performs at least one operation based on the second result.

9. The computer-implemented method of any of clauses 1-8, further comprising generating the first API request based on the first task and the first API.

10. The computer-implemented method of any of clauses 1-9, wherein the first API request is transmitted directly to the first API.

11. In some embodiments, a computer-readable storage medium includes instructions that, when executed by a processor, cause the processor to perform the steps of receiving a first task from a first client application, wherein the first task is associated with first content; performing one or more operations on the first content to generate first predicted performance data associated with a plurality of application programming interfaces (APIs); determining that a first API included in the plurality of APIs should process the first task based on the first predicted performance data; transmitting a first API request associated with the first task to the first API for processing; and receiving a first result associated with the first task from the first API, wherein the first client application performs at least one operation based on the first result.

12. The computer-readable storage medium of clause 11, wherein performing the one or more operations comprises determining that a first machine-learning model included in a plurality of machine-learning models should be used to generate the first predicted performance data based on at least one of a first goal associated with the first task and a first content type associated with the first task, wherein the first machine-learning model maps task content to predicted performance data; and generating the first predicted performance data based on the first content and the first machine-learning model.

13. The computer-readable storage medium of clause 11 or 12, further comprising receiving a second task from the first client application, wherein the second task is associated with second content; performing one or more operations on the second content to generate second predicted performance data associated with the plurality of APIs; determining, based on the second predicted performance data, that none of the APIs included in the plurality of APIs satisfies a performance requirement; and indicating to the first client application that the second task has not been allocated to any of the APIs included in the plurality of APIs.

14. The computer-readable storage medium of any of clauses 11-13, further comprising receiving, from the first client application, feedback associated with the first result; performing one or more training operations on a first machine-learning model based on the first content and the feedback to generate a second machine-learning model that maps task content to predicted performance data; receiving a second task from a second client application, wherein the second task is associated with second content; determining that a second API included in the plurality of APIs should process the second task based on the second machine-learning model and the second content; transmitting a second API request associated with the second task to the second API for processing; and receiving a second result associated with the second task from the second API, wherein the second client application performs at least one operation based on the second result.

15. The computer-readable storage medium of any of clauses 11-14, wherein the first machine-learning model comprises a convolutional neural network pre-trained using an image database or a recurrent neural network pre-trained using a plurality of word embeddings.

16. The computer-readable storage medium of any of clauses 11-15, wherein the first predicted performance data includes a different value for a quality metric for each API included in the plurality of APIs.

17. The computer-readable storage medium of any of clauses 11-16, wherein the first content comprises at least one of text, audio content, and image content.

18. The computer-readable storage medium of any of clauses 11-17, wherein determining that the first API should process the first task comprises determining that a first metric value included in the first predicted performance data satisfies a performance requirement and that the first metric value is associated with the first API.

19. The computer-readable storage medium of any of clauses 11-18, wherein the first client application receives the first result directly from the first API.

20. In some embodiments, a system comprises a memory storing instructions; and a processor that is coupled to the memory and, when executing the instructions, is configured to receive a task from a client application, wherein the task is associated with first content; perform one or more operations on the first content to generate predicted performance data associated with a plurality of application programming interfaces (APIs); determine that a first API included in the plurality of APIs should process the task based on the predicted performance data; transmit an API request associated with the task to the first API for processing; and receive a result associated with the task from the first API, wherein the client application performs at least one operation based on the result.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   receiving a first task from a first client application, wherein the first task is associated with first content;
   performing one or more operations on the first content to generate first predicted performance data associated with a plurality of application programming interfaces (APIs);
   identifying, based on the first predicted performance data, a first API included in the plurality of APIs for executing the first task;
   transmitting a first API request associated with the first task to the first API for executing the first task; and
   receiving a first result associated with the first task from the first API, wherein the first client application performs at least one operation based on the first result.

2. The computer-implemented method of claim 1, wherein performing the one or more operations comprises:
   determining that a first machine-learning model included in a plurality of machine-learning models should be used to generate the first predicted performance data based on one or more characteristics of the first task, wherein the first machine-learning model maps content associated with tasks to predicted performance data; and
   generating the first predicted performance data based on the first content and the first machine-learning model.

3. The computer-implemented method of claim 2, wherein the first machine-learning model comprises at least one of a convolutional neural network, a recurrent neural network, or a Support Vector Machine.

4. The computer-implemented method of claim 1, further comprising:
   receiving a second task from the first client application, wherein the second task is associated with second content;
   performing one or more operations on the second content to generate second predicted performance data associated with the plurality of APIs;
   determining, based on the second predicted performance data, that none of the APIs included in the plurality of APIs satisfies a performance requirement; and
   indicating to the first client application that the second task has not been allocated to any of the APIs included in the plurality of APIs.

5. The computer-implemented method of claim 1, further comprising:
   receiving, from the first client application, feedback associated with the first result;
   performing one or more training operations on a first machine-learning model based on the first content and the feedback to generate a second machine-learning model that maps content associated with tasks to predicted performance data;
   receiving a second task from a second client application, wherein the second task is associated with second content;
   determining that a second API included in the plurality of APIs should process the second task based on the second machine-learning model and the second content;
   transmitting a second API request associated with the second task to the second API for processing; and
   receiving a second result associated with the second task from the second API, wherein the second client application performs at least one operation based on the second result.

6. The computer-implemented method of claim 1, wherein the first predicted performance data includes a different value for a performance metric for each API included in the plurality of APIs.

7. The computer-implemented method of claim 1, wherein the first content comprises at least one of text content, audio content, or image content.

8. The computer-implemented method of claim 1, further comprising:
   receiving a second task from a second client application;
   determining that a second API included in the plurality of APIs should process the second task based on a probability distribution;
   transmitting a second API request associated with the second task to the second API for processing; and
   receiving a second result associated with the second task from the second API, wherein the second client application performs at least one operation based on the second result.

9. The computer-implemented method of claim 1, further comprising generating the first API request based on the first task and the first API.

10. The computer-implemented method of claim 1, wherein the first API request is transmitted directly to the first API.

11. One or more non-transitory computer-readable media including instructions that, when executed by a processor one or more processors, cause the one or more processors to perform the steps of:
- receiving a first task from a first client application, wherein the first task is associated with first content;
- performing one or more operations on the first content to generate first predicted performance data associated with a plurality of application programming interfaces (APIs);
- identifying, based on the first predicted performance data, a first API included in the plurality of APIs for executing the first task;
- transmitting a first API request associated with the first task to the first API for processing; and
- transmitting a first API request associated with the first task to the first API for executing the first task; and
- receiving a first result associated with the first task from the first API, wherein the first client application performs at least one operation based on the first result.

12. The one or more non-transitory computer-readable media of claim 11, wherein performing the one or more operations comprises:
- determining that a first machine-learning model included in a plurality of machine-learning models should be used to generate the first predicted performance data based on at least one of a first goal associated with the first task or a first content type associated with the first task, wherein the first machine-learning model maps content associated with tasks to predicted performance data; and
- generating the first predicted performance data based on the first content and the first machine-learning model.

13. The one or more non-transitory computer-readable media of claim 11, further comprising:
- receiving a second task from the first client application, wherein the second task is associated with second content;
- performing one or more operations on the second content to generate second predicted performance data associated with the plurality of APIs;
- determining, based on the second predicted performance data, that none of the APIs included in the plurality of APIs satisfies a performance requirement; and
- indicating to the first client application that the second task has not been allocated to any of the APIs included in the plurality of APIs.

14. The one or more non-transitory computer-readable media of claim 11, further comprising:
- receiving, from the first client application, feedback associated with the first result;
- performing one or more training operations on a first machine-learning model based on the first content and the feedback to generate a second machine-learning model that maps content associated with tasks to predicted performance data;
- receiving a second task from a second client application, wherein the second task is associated with second content;
- determining that a second API included in the plurality of APIs should process the second task based on the second machine-learning model and the second content;
- transmitting a second API request associated with the second task to the second API for processing; and
- receiving a second result associated with the second task from the second API, wherein the second client application performs at least one operation based on the second result.

15. The one or more non-transitory computer-readable media of claim 14, wherein the first machine-learning model comprises at least one of a convolutional neural network pre-trained using an image database or a recurrent neural network pre-trained using a plurality of word embeddings.

16. The one or more non-transitory computer-readable media of claim 11, wherein the first predicted performance data includes a different value for a quality metric for each API included in the plurality of APIs.

17. The one or more non-transitory computer-readable media of claim 11, wherein the first content comprises at least one of text content, audio content, or image content.

18. The one or more non-transitory computer-readable media of claim 11, wherein identifying the first API comprises determining that a first metric value included in the first predicted performance data satisfies a performance requirement and that the first metric value is associated with the first API.

19. The one or more non-transitory computer-readable media of claim 11, wherein the first client application receives the first result directly from the first API.

20. A system, comprising:
- a memory storing instructions; and
- a processor that is coupled to the memory and, when executing the instructions, is configured to:
  - receive a task from a client application, wherein the task is associated with first content;
  - perform one or more operations on the first content to generate predicted performance data associated with a plurality of application programming interfaces (APIs);
  - determine that a first API included in the plurality of APIs should process the task based on the predicted performance data;
  - identify, based on the predicted performance data, a first API included in the plurality of APIs for executing the task;
  - transmit an API request associated with the task to the first API for executing the task; and
  - receive a result associated with the task from the first API, wherein the client application performs at least one operation based on the result.

* * * * *

UNITED STATES PATENT AND TRADEMARK OFFICE
CERTIFICATE OF CORRECTION

PATENT NO. : 10,754,712 B2
APPLICATION NO. : 16/048169
DATED : August 25, 2020
INVENTOR(S) : Matthew Charles Petrillo et al.

Page 1 of 1

It is certified that error appears in the above-identified patent and that said Letters Patent is hereby corrected as shown below:

On the Title Page

(56) References Cited:

Column 2, Line 11, please delete "9,760,384 B1 * 1/2017 Chauhan" and insert --9,760,384 B1 * 9/2017 Chauhan--;

Column 2, Line 13, please delete "2016/0292018 A1 * 6/2016 Laredo" and insert --2016/0292018 A1 * 10/2016 Laredo--;

In the Claims

Column 19, Claim 11, Line 2, please delete "a processor".

Signed and Sealed this
Twentieth Day of October, 2020

Andrei Iancu
*Director of the United States Patent and Trademark Office*